United States Patent
Lee et al.

(10) Patent No.: US 10,901,846 B2
(45) Date of Patent: Jan. 26, 2021

(54) MAINTENANCE OF STORAGE DEVICES WITH MULTIPLE LOGICAL UNITS

(71) Applicant: Microsoft Technology Licensing, LLC, Redmond, WA (US)

(72) Inventors: Scott Chao-Chueh Lee, Bellevue, WA (US); Aaron William Ogus, Woodinville, WA (US); Subhasish Bhattacharya, Seattle, WA (US); Bryan Stephen Matthew, Seattle, WA (US); Srinivasan Malayala, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 15/943,555

(22) Filed: Apr. 2, 2018

(65) Prior Publication Data
US 2019/0303243 A1 Oct. 3, 2019

(51) Int. Cl.
*G06F 11/00* (2006.01)
*G06F 11/10* (2006.01)
(Continued)

(52) U.S. Cl.
CPC ........ *G06F 11/1092* (2013.01); *G06F 3/0605* (2013.01); *G06F 3/065* (2013.01);
(Continued)

(58) Field of Classification Search
CPC ............. G06F 11/1092; G06F 11/1088; G06F 3/0605; G06F 3/0619; G06F 3/065; G06F 11/1662; G06F 11/2094; H04L 67/1097
(Continued)

(56) References Cited

U.S. PATENT DOCUMENTS 6,154,853 A 11/2000 Kedem
9,251,025 B1 * 2/2016 Dykes ................... G06F 11/076
(Continued)

OTHER PUBLICATIONS

Wikipedia "Degraded Mode" page from date Aug. 28, 2017, retrieved using the Way Back Machine, from https://web.archive.org/web/20170828040950/https://en.wikipedia.org/wiki/Degraded_mode (Year: 2017).*

(Continued)

*Primary Examiner* — Yair Leibovich
(74) *Attorney, Agent, or Firm* — Newport IP, LLC; Jacob P. Rohwer

(57) ABSTRACT

The techniques described herein are configured to improve the remanufacturing process by waiting to rebuild selective data items stored on a storage device that is unavailable. A storage device is unavailable when it is taken offline and/or disconnected from a network. The storage device may be taken offline due to a failed component (e.g., an actuator arm, an actuator head, damage to the underlying storage media, etc.). The storage device comprises multiple independent logical units, where a logical unit is a uniquely addressable portion of a storage device that is visible and/or that is exposed to a host. Accordingly, the techniques described herein are configured to conserve resources by selectively rebuilding data items stored in logical units of an offline storage device that are not affected by a remanufacturing process implemented due to a failed component.

9 Claims, 7 Drawing Sheets

(51) Int. Cl.
  *G06F 3/06* (2006.01)
  *G06F 11/16* (2006.01)
  *G06F 11/20* (2006.01)
  *H04L 29/08* (2006.01)

(52) U.S. Cl.
  CPC ........ *G06F 3/0619* (2013.01); *G06F 11/1088* (2013.01); *G06F 11/1662* (2013.01); *G06F 11/2094* (2013.01); *H04L 67/1097* (2013.01)

(58) Field of Classification Search
  USPC ........................................ 714/6.32
  See application file for complete search history.

(56) References Cited

U.S. PATENT DOCUMENTS

| | | | |
|---|---|---|---|
| 2008/0219189 A1* | 9/2008 | Kitchin | H04L 12/1863 370/277 |
| 2010/0218037 A1* | 8/2010 | Swartz | G06F 16/00 714/6.12 |
| 2012/0079317 A1 | 3/2012 | Nelogal et al. | |
| 2014/0115579 A1* | 4/2014 | Kong | G06F 3/0605 718/1 |
| 2017/0249213 A1 | 8/2017 | Slik et al. | |
| 2018/0025786 A1 | 1/2018 | Coglitore | |
| 2019/0356609 A1* | 11/2019 | Grunwald | G06F 11/2097 |

OTHER PUBLICATIONS

Wikipedia "RAID Degraded Mode" page from date Mar. 19, 2018, retrieved using the Way Back Machine, from https://web.archive.org/web/20180319234810/https://en.wikipedia.org/wiki/RAID (Year: 2018).*

Wikipedia "Logical Unit Number" page from date Aug. 28, 2017, retrieved from https://en.wikipedia.org/wiki/Logical_unit_number (Year: 2020).*

Wikipedia "Hard Disk Drive" page from date Aug. 28, 2017, retrieved from https://en.wikipedia.org/wiki/Hard_disk_drive (Year: 2020).*

"International Search Report and Written Opinion Issued in PCT Application No. PCT/US2019/023780", dated Jul. 5, 2019, 18 Pages.

* cited by examiner

MAINTENANCE OF STORAGE DEVICES WITH MULTIPLE LOGICAL UNITS

BACKGROUND

As the use of personal devices (e.g., smartphones, tablet devices, personal computers, etc.) becomes more prevalent, a large amount of data (e.g., photos, videos, applications or "apps", operating system files, documents, social media profile/account information, etc.) useable in association with the personal devices needs to be stored. Network storage resources are often used to store the data. For instance, network storage resources may be provided by a distributed data storage system which can be composed of one or more data centers. The distributed data storage system may be maintained as part of the "cloud" (e.g., cloud storage and cloud computing) accessible to personal devices via a network connection.

A distributed data storage system typically comprises numerous storage devices (e.g., hundreds, thousands, etc.) dispersed amongst one or more data centers. The distributed data storage system operates the storage devices in a coordinated fashion to provide efficient and reliable storage of various types of data, examples of which are described above. However, individual storage devices may become unavailable in a distributed storage system. For instance, a storage device may be unavailable when it is taken offline to repair or to remanufacture a failed component. In one example, the storage device comprises a hard disk drive (HDD) and a failed component of the HDD (e.g., an actuator arm, an actuator head, etc.) provides a reason for the storage device to be remanufactured. The failure of an actuator head (may also be referred to as a head crash) can occur when the actuator head contacts or scratches a data storage surface (e.g., a surface of a platter), thereby causing severe data loss.

Conventionally, when the storage device is unavailable for remanufacturing purposes, all the data stored on the storage device is inaccessible. This includes uncompromised data that was not affected (e.g., not lost and/or not damaged) by a failed component of the storage device. Upon scheduling the storage device for remanufacturing, a distributed data storage system typically consumes a considerable amount of resources to rebuild all the data stored on the storage device prior to the storage device being taken offline or while the storage device is offline. It is with respect to these and other considerations that the disclosure made herein is presented.

SUMMARY

The techniques described herein provide a more efficient approach to rebuilding data stored on a storage device that is unavailable, or that is scheduled to become unavailable. A storage device is unavailable when it is taken offline or disconnected from a network. As described above, the storage device may be taken offline, or be scheduled to be taken offline, due to a failed component (e.g., an actuator arm, an actuator head, damage to the underlying media, etc.). While offline, the data stored on the storage device is inaccessible to a host configured to interact with the storage device. For instance, the host may comprise a storage system component or module configured to coordinate the storage of data. Further examples of a host can include a file system, an application, an operating system, and so forth.

The techniques described herein reduce the amount of resources (e.g., processing resources, networking resources, and/or storage resources) used to rebuild data stored on a storage device that is offline or that is scheduled to become offline. Maintenance tasks (e.g., remanufacturing) typically increase a load on a data storage system which thereby causes additional latency for components and/or users (e.g., customers) of the data storage system. This increased load and additional latency can be minimized by intelligently rebuilding some, but not all, of the data stored on a storage device that is offline or scheduled to be taken offline.

In the examples described herein, a storage device comprises multiple independent logical units. A logical unit is a uniquely addressable portion of a storage device that is visible and/or that is exposed to a host. For instance, a first logical unit may comprise a first addressable namespace for a host while a second logical unit may comprise a second addressable namespace for the host, and the first and second addressable namespaces do not overlap. To this end, a storage device can comprise a hard disk drive (HDD), a flash drive, a solid-state drive, and other types of storage.

In the case of a storage device with multiple independent logical units, a remanufacturing process implemented due to a failed component (e.g., a head crash) may often only impact one logical unit. The logical unit impacted by a failed component may be referred to herein as a "compromised" logical unit of a storage device. Stated another way, only the logical unit associated with the failed component may need to be remanufactured. In one example, the logical unit may be composed of one or more platter surfaces of an HDD, and the failed component may only damage data on one of the platter surface(s) of the logical unit. Meanwhile, data stored in other logical units on the storage device which are composed of other portions of the storage device (e.g., other platter surfaces of the HDD) may be unaffected. These other logical units may be referred to herein as "uncompromised" logical units of a storage device.

With this in mind, embodiments described herein are configured to wait to rebuild data items stored in the uncompromised logical units of the storage device. The rebuilding of a data item stored in the uncompromised logical units can be initiated, or triggered, based on an observance of a valid reason. In many situations, the observance of a valid reason may occur after the storage device is taken offline to remanufacture the compromised logical unit of the storage device. In one example, a determination that a data access request (e.g., a read operation) for a data item stored on an uncompromised logical unit has been received can provide a valid reason to rebuild the data item. In another example, a determination that the reliability and/or durability of a data object associated with the data item is in jeopardy can provide a valid reason to rebuild the data item. In this scenario, a data storage system is configured to monitor the health and status of various data items stored amongst storage devices in the data storage system.

Accordingly, the techniques described herein are configured to monitor, while the storage device is offline, for valid reasons to rebuild a data item, and when a valid reason is observed or determined, the techniques rebuild the data item. Consequently, a data storage system does not have to expend a considerable amount of resources to completely rebuild all the data on the storage device prior to the storage device going offline, or while the storage device is offline. Rather, the techniques described herein selectively rebuild individual data items provided a valid reason to do so (e.g., a data access request for the data item is received, the reliability and/or durability of a data object associated with the data item is in jeopardy, etc.). Not having to rebuild all the data on the uncompromised logical units of a storage device is possible because, as described above, the uncompromised logical units are not impacted by the failed component and/or the remanufacturing process. As a result, the data stored on the uncompromised logical units becomes available again once the storage device comes back online after the remanufacturing process is completed.

Additional embodiments described herein are configured to wait to rebuild data items stored in other logical units of the storage device based on a reliability format in which the data item is stored. In one example, a data item may comprise a complete replica of an entire data object (e.g., a file) and the reliability format comprises storing a predetermined number (e.g., two, three, four, five) of replicas of the data item amongst different storage devices. In another example, a data item may comprise a portion (e.g., a fragment) of a data object and the reliability format comprises dividing a data object into a number of data fragments and storing the data fragments along with coding fragments as an erasure coded data object amongst different storage devices.

Given the different reliability formats in which a data object can be stored in a data storage system, as well as a scenario where a storage device with multiple logical units is to be taken offline to remanufacture a compromised logical unit, the techniques described herein can identify, in the uncompromised logical units, data items that are stored as a replica of an entire data object (may be referred to herein as "replica" data items). The replica data items can be immediately rebuilt. Stated another way, the "immediate" rebuilding of a replica data item does not wait until a valid rebuilding reason is observed. In contrast, the techniques wait to rebuild data items that are fragments of an erasure coded data object (may be referred to there as "fragment" data items). Similar to the discussion above, the rebuilding of a fragment data item stored in the uncompromised logical units can be initiated, or triggered, based on an observance of a valid reason (e.g., a data access request for the data item is received, the reliability and/or durability of an erasure coded data object of which the data item is a part is in jeopardy, etc.).

The data storage system may be configured to immediately rebuild replica data items stored on uncompromised logical units because the corresponding data object is, or qualifies, as a data object that has been frequently accessed or that is expected to be frequently accessed (may be referred to herein as a "hot" data object). Accordingly, a storage policy configures such data objects to be stored as replica data items. In contrast, fragment data items are typically associated with data objects that are not being frequently accessed or that are not expected to be frequently accessed (may be referred to herein as a "cold" data object). Consequently, immediately rebuilding the replica data items stored in the logical units can provide higher performance metrics and/or response times for hot data objects.

Furthermore, another reason to immediately rebuild replica the data items stored on uncompromised logical units is because, from a resource consumption perspective, it is cheaper to rebuild replica data items compared to rebuilding fragment data items. Stated alternatively, the amount of resources used to rebuild a replica data item is much less than that used to rebuild a fragment data item. This is because to rebuild a fragment data item, a data storage system must read multiples of the original amount of data that is lost or unavailable. For instance, given an erasure coded data object with six data fragments and three code fragments (e.g., a "6+3" erasure coded data object), a data storage system can sustain up to three lost fragments. However, to rebuild a lost fragment, the data storage system has to read at least six fragments (e.g., six equations) which means the data storage system has to read six times the original amount of data it is trying to rebuild. To further illustrate quantitatively, to rebuild a ten terabyte (TB) platter that completely stores fragment data items that are part of numerous "6+3" erasure coded data objects, a data storage system would have to read sixty TB of data. In contrast, to rebuild a ten TB platter that completely stores replica data items associated with a number of entire data objects, the data storage system would only have to read ten TB of data.

In a situation where the data item comprises a replica of an entire data object, the rebuilding of the data item of an uncompromised logical unit of a first storage device includes accessing an available replica of the data item from a different storage device, creating an additional replica of the data item based on the accessed replica of the data item (e.g., making another replica or copy of the data item), and storing the additional replica of the data item in yet another storage device (e.g., for reliability and durability purposes).

In a situation where the data item comprises a fragment (e.g., a data fragment or a code fragment) of an erasure coded data object, the rebuilding of the data item of an uncompromised logical unit of a first storage device includes accessing a plurality of other fragments of the erasure coded data object from other storage devices, recovering (e.g., reconstructing) the data item using the plurality of other fragments, and storing the recovered data item in another storage device. In some implementations, the erasure encoded data object can be constructed from the fragments as part of the rebuilding process. This construction of the entire data object can be based on a data access request (e.g., a read operation). An initial data access request provides a strong indication that a data object is going to be accessed again.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical element. References made to individual elements of a plurality of elements can use a reference number with another number included within a parenthetical (and/or a letter without a parenthetical) to refer to each individual element. Generic references to the elements may use the specific reference number without the sequence of letters.

DETAILED DESCRIPTION

Figure 1:
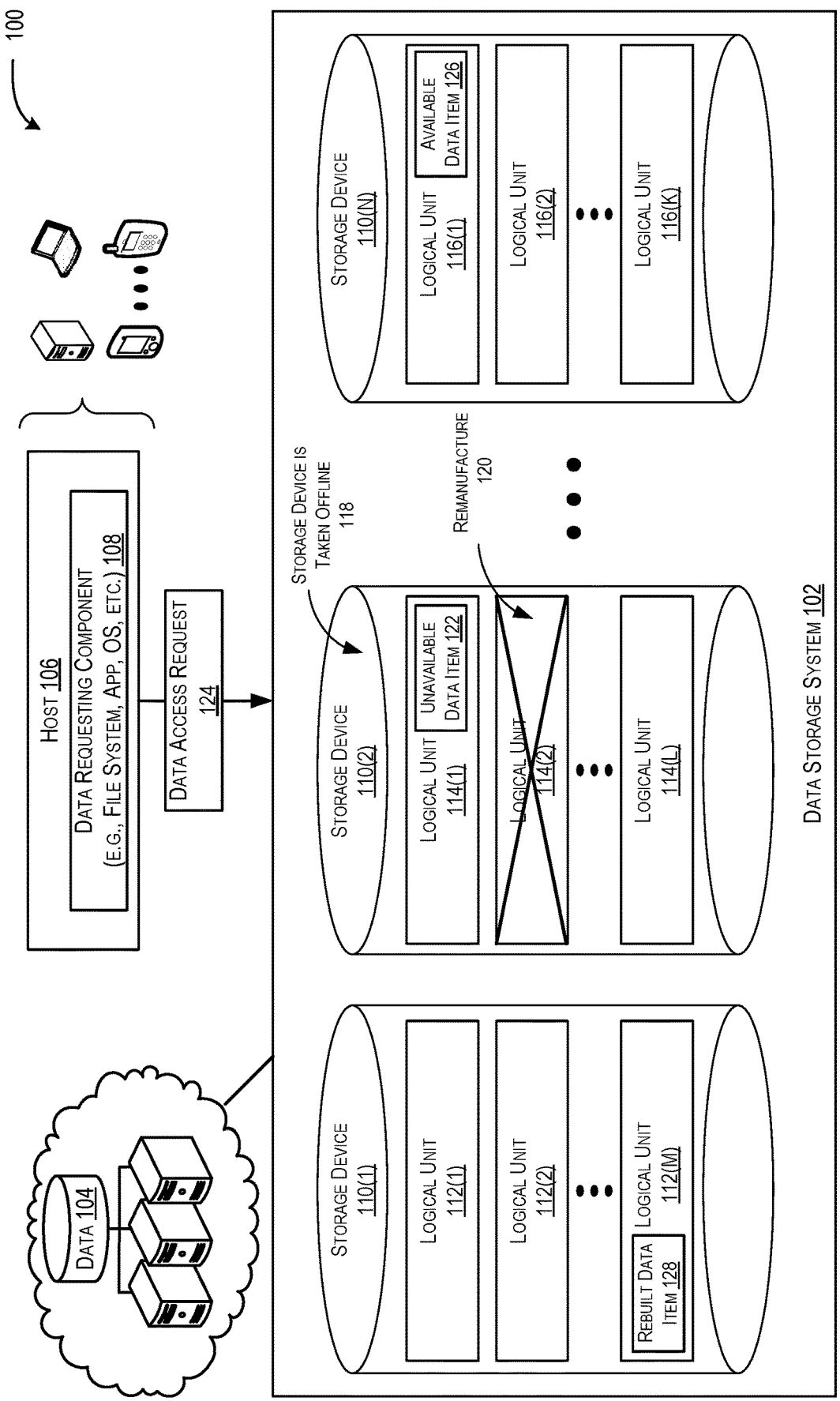
FIG. 1 is a diagram that illustrates an example environment in which the rebuilding of data items stored in uncompromised logical units of an offline storage device is initiated, or triggered, based on an observance of a valid reason.

The techniques described herein are configured to improve the remanufacturing process by waiting to rebuild selective data items stored on a storage device that is unavailable. As described above, a storage device is unavailable when it is taken offline and/or disconnected from a network. The storage device may be taken offline, or be scheduled to be taken offline, due to a failed component (e.g., an actuator arm, an actuator head, damage to the underlying storage media, etc.). The storage device comprises multiple independent logical units, where a logical unit is a uniquely addressable portion of a storage device that is visible and/or that is exposed to a host. Accordingly, a remanufacturing process implemented due to a failed component (e.g., a head crash) may often only impact one logical unit (i.e., a "compromised" logical unit). Meanwhile, data stored in other logical units on the same storage device (i.e., "uncompromised" logical units) may be unaffected by the remanufacturing process. Stated another way, the data stored in the uncompromised logical units is neither damaged nor lost, and therefore, will be available for access again after the remanufacturing process is complete and the storage device is brought back online.

In various embodiments, the rebuilding of a data item stored in the uncompromised logical units can be initiated, or triggered, based on an observance of a valid reason. For instance, a determination that a data access request (e.g., a read operation) for a data item stored on an uncompromised logical unit has been received can provide a valid reason to rebuild the data item. Or, a determination that the reliability and/or durability of a data object associated with the data item is in jeopardy can provide a valid reason to rebuild the data item. Using these techniques, a data storage system does not have to expend a considerable amount of resources to completely rebuild all the data on the storage device prior to the storage device going offline, or while the storage device is offline.

In additional embodiments, the rebuilding of a data item stored in an uncompromised logical unit of a storage device can be based on a reliability format in which the data item is stored (e.g., a complete replica of an entire data object or a fragment of an erasure coded data object). Given the different reliability formats in which a data object can be stored in a data storage system, these additional embodiments immediately rebuild replica data items without waiting for a valid rebuilding reason to occur. In contrast, these additional embodiments wait to rebuild fragment data items based on an observance of a valid reason (e.g., a data access request for the fragment data item is received, the reliability and/or durability of an erasure coded data object of which the fragment data item is a part is in jeopardy, etc.).

Consequently, the techniques described herein reduce the amount of resources (e.g., processing resources, networking resources, and/or storage resources) used to rebuild data stored on a storage device that is offline, or that is scheduled to become offline. Maintenance tasks such as remanufacturing typically increase a load on a data storage system which thereby causes additional latency for components and/or users (e.g., customers) of the data storage system. This increased load and additional latency has the potential to disrupt experiences. However, this increased load and additional latency can be minimized by intelligently rebuilding some, but not all, of the data stored on a storage device that is offline or scheduled to be taken offline, as further described with respect to the examples provided herein.

FIG. 1 is a diagram that illustrates an example environment 100 in which the rebuilding of data items stored in uncompromised logical units of an offline storage device is initiated, or triggered, based on an observance of a valid reason. The example environment 100 comprises a data storage system 102 that is tasked with storing data 104 (e.g., large quantities of data). The data can be accessed by various host(s) 106, where a host 106 comprises or includes a data requesting component 108 (e.g., a file system, an application, an operating system, etc.). The data storage system 102 can be a distributed data storage system comprising: disk array systems, data grids, object stores, archival storage, and/or object-based network (e.g., cloud) storage. Examples of a data object stored in the data storage system can include: a file, a video, an image, a document, an application, an account profile, a Web page, an executable, etc.

To this end, a host 106 can comprise or be part of a device such as a desktop computing device, a laptop computing device, a tablet computing device, a smart phone device, a personal digital assistant (PDA), a server device, a set-top-box device, a digital video recorder (DVR) device, a game console device, a video streaming device, a personal video player device, a security camera device, a wearable device, an Internet of Things (IoT) device, or other wired and/or wireless communication devices.

The data storage system 102 includes a plurality of storage devices 110(1) through 110(N) (where N is a positive integer number that can include hundreds, thousands, or even millions of storage devices). The storage devices 110(1) through 110(N) may collectively be referred to herein as storage devices 110. A storage device can comprise a hard disk drive (HDD), a flash drive, a solid-state drive, etc., and the underlying storage media can include volatile and/or non-volatile memory implemented via various technologies for storage of data. In various examples, the storage devices 110 are configured to operate amongst one or more data centers or other types of network storage resources. In various examples, a network used to implement the techniques described herein may be a large production network such as a data-center network (DCN), an Internet service provider (ISP) network, an enterprise network (e.g., a cloud service) or any other domain that may be under control of an entity. Examples devices of the data storage system 102 can include a switching device (a switch), a routing device (a router), a gateway device (a gateway), a bridging device (a network bridge), a hub device (a network hub), a firewall device, a network address translator device (a NAT), a multiplexing device (a multiplexer), a wireless access point device (a WAP), a proxy server device, a file server device, a database server device, a storage device, etc.

As described above, individual ones of the storage devices 110 include multiple independent logical units. A logical unit is a uniquely addressable portion of a storage device that is visible and/or that is exposed to a host 106. As shown, storage device 110(1) comprises logical units 112(1) through 112(M) (where M is a positive integer number). Storage device 110(2) comprises logical units 114(1) through 114(L) (where L is a positive integer number). And storage device 110(N) comprises logical units 116(1) through 116(K) (where K is a positive integer number). The number of logical units may be the same or may vary from one storage device to the next (e.g., M, L, and/or K can be the same number or different numbers). In one specific but non-limiting example, a storage device in the data storage system 102 comprises a hard disk drive (HDD) with eight platters and sixteen surfaces, and the storage device includes between two and eight logical units.

As described above, a storage device includes components that can fail over time, and the failed components can affect the data stored on the storage device, the manner in which the data can be accessed (e.g., read from the storage device), and/or the manner in which data can be written to the storage device. In the example of an HDD, a failed component can include an actuator arm and/or an actuator head. The failure of an actuator arm and/or an actuator head can occur when the actuator head contacts or scratches a data storage surface (e.g., a surface of a platter), thereby causing damage to the data and/or severe data loss. A failed component provides a reason for the storage device to be remanufactured, and as described above, the storage device must be taken offline to implement the remanufacturing process.

To illustrate, FIG. 1 shows that storage device 110(2) is taken offline 118 in order to remanufacture 120 logical unit 114(2). As described above, logical unit 114(2) may have experienced a failed actuator head (e.g., a head that scratched the surface of a platter that is part of logical unit 114(2)). Accordingly, logical unit 114(2) is a compromised logical unit that needs to be remanufactured (e.g., the "X" through logical unit 114(2) represents its unavailability due to the remanufacturing 120).

Conventionally, when a logical unit needs to be remanufactured and the storage device on which the logical unit resides needs to be taken offline, all the data on the storage device is automatically rebuilt prior to the storage device being taken offline and/or while the storage device is offline. This includes the data that is stored on logical units other than the compromised logical unit that needs to be remanufactured. In the case of storage device 110(2), data stored on logical unit 114(1) and logical unit 114(L) is not permanently impacted by the remanufacturing 120 of logical unit 114(2), and thus, logical unit 114(1) and logical unit 114(L) are uncompromised logical units. FIG. 1 shows that uncompromised logical unit 114(1) on storage device 110(2) comprises a data item 122 that is unavailable or will be unavailable as a result of the storage device 110(2) being taken offline to implement the remanufacturing 120 of compromised logical unit 114(2). However, the unavailable data item 122 will eventually be available again once the remanufacturing 120 of the compromised logical unit 114(2) is completed and the storage device 110(2) is back online.

With this in mind, the data storage system 102 does not automatically rebuild the unavailable data item 122. Rather, the data storage system 102 waits until a valid reason to rebuild the unavailable data item is observed. For example, the data storage system 102 can determine (e.g., observe) that a data access request 124 (e.g., a read operation) for the unavailable data item 122 has been received. In another example, the data storage system 102 can determine (e.g., observe) that the reliability and/or durability of a data object associated with the unavailable data item 122 is in jeopardy.

In a scenario where the unavailable data item 122 is a complete replica of an entire data object, the reliability and/or durability of the data object can be in jeopardy when a threshold number of replicas of the data object are unavailable at a given time. As an example, a storage policy may require that a predetermined total number of replicas (e.g., two, three, four, five, and so forth) of the data object be stored across different storage devices 110 in the data storage system 102. The storage policy may set the threshold number of unavailable replicas to be one less than the predetermined number. Thus, if the storage policy requires that a total of three replicas of a data object be stored on three different storage devices 110 in the data storage system 102, and two of the three replicas are unavailable at a given time (i.e., the threshold number is two), then the data storage system 102 can determine (e.g., observe) that the reliability and/or durability of the data object is in jeopardy. Other total numbers of replicas and other thresholds can be set in accordance with different storage and reliability policies.

In a scenario where the unavailable data item 122 is a fragment (e.g., a data fragment or a coding fragment) of an erasure coded data object, the reliability and/or durability of the data object can be in jeopardy when a threshold number of fragments of the erasure coded data object are unavailable at a given time. As an example, a storage policy may require that the erasure coded data object tolerate up to a predetermined number of unavailable (e.g., lost or corrupted) fragments (e.g., one, two, three, four, five, and so forth). The fragments can be stored across different storage devices 110 in the data storage system 102. The storage policy may further set the threshold number of unavailable fragments to be one less than the predetermined number of unavailable fragments that can be tolerated. Thus, if the storage policy requires that an erasure coded data object be able to tolerate up to three unavailable fragments, and two fragments of the erasure coded data object are unavailable at a given time (i.e., the threshold number is two), then the data storage system 102 can determine (e.g., observe) that the reliability and/or durability of the erasure coded data object is in jeopardy. Again, other numbers of lost fragments that can be tolerated and other thresholds can be set in accordance with different storage and reliability policies.

Erasure coding divides an individual data object (e.g., a data file, a data collection, etc.) into smaller pieces, which are referred to herein as data fragments. The data fragments may also generally be referred to as data "chunks" or data "symbols". Erasure coding also creates one or more coding fragments to be associated with the data fragments. For example, the coding fragment(s) can comprise a mathematical function or an algorithm that describes a set of numbers so the coding fragment(s) can be checked for accuracy and recovered if one is lost. Consequently, the coding fragment(s) enable the original data object to be reconstructed and/or recovered in an event one or more of the data fragments is lost.

To further explain, erasure coding involves dividing, or breaking up, a data object into k data fragments. The original k data fragments can be transformed via a mathematical function or an algorithm to incorporate one or more new coding fragments, thereby producing N total fragments associated with the erasure coded data object. In a first example, a data object divided into ten data fragments (k=10) can be transformed via a mathematical function or an algorithm to incorporate a single coding fragment, and thus, in this example N="11". In a second example, a data object divided into one hundred data fragments (k=100) can be transformed via a mathematical function or an algorithm to incorporate five coding fragments, and thus, in this second example N="105". The transformation of k data fragments into N data fragments is such that the original data object can be reconstructed from any subset of the N fragments that has the same size as k. Stated another way, a lost fragment associated with the data object can be recovered and restored if a sufficient number of other fragments associated with the data object are available. Thus, referring to the first example above, if only one fragment is lost (e.g., a data fragment or the coding fragment), then a sufficient amount of information (e.g., a sufficient number of other fragments) remains to reconstruct the data object and/or to rebuild the lost fragment (e.g., 11-1=10, which is of the same size as the original k data fragments). The erasure coded data object of this first example can therefore tolerate one lost fragment. Referring to the second example above, if five or less fragments are lost, then a sufficient amount of information remains to reconstruct the data object and/or to rebuild the lost fragments (e.g., 105-5=100, which is of the same size as the original k data fragments). The erasure coded data object of this second example can therefore tolerate up to five lost fragments. Consequently, erasure coding offers robust storage and backup of data because N minus k fragments can be lost without affecting the integrity of the original data object. Moreover, a higher N to k ratio can increase the robustness of the storage (e.g., create a higher recovery rate). Example erasure encoding techniques include parity (e.g., XOR) encoding, Reed-Solomon coding, etc.

In various examples, the data storage system 102 uses various factors to determine a number of fragments to use for an erasure coded data object. These factors can include a size of a data object. For example, a large data file (e.g., a 256 gigabyte file) can be divided into more data fragments compared to a smaller data file (e.g., a 64 gigabyte file). Therefore, a greater number of storage devices are utilized for a larger file compared to a smaller file. Furthermore, the data storage system 102 can be configured to select a number of replicas of a data object to be stored based on various factors. For example, the factors can include user input (e.g., a user has signed up and paid for more reliable storage) and/or a type of information (e.g., important information that requires more reliable storage).

In a scenario where the unavailable data item 122 in FIG. 1 comprises a replica of an entire data object and a valid reason to rebuild the unavailable data item 122 is observed, the data storage system 102 is configured to rebuild the unavailable data item 122 by accessing an available replica of the data item (e.g., available data item 126) from a different storage device (e.g., storage device 110(N)) that is online, creating an additional replica of the unavailable data item 122 based on the accessed replica of the data item, and storing the additional replica of the data item (e.g., the rebuilt data item 128) in yet another storage device (e.g., storage device 110(1)) for reliability and durability purposes.

In a scenario where the unavailable data item 122 in FIG. 1 comprises a fragment (e.g., a data fragment or a code fragment) of an erasure coded data object and a valid reason to rebuild the unavailable data item 122 is observed, the data storage system 102 is configured to rebuild the unavailable data item 122 by accessing a plurality of other available fragments of the erasure coded data object (e.g., available data item 126) from other storage devices (e.g., storage device 110(N)) that are online, recovering the unavailable data item 122 using the plurality of other available fragments, and storing the recovered data item (e.g., the rebuilt data item 128) in another storage device (e.g., storage device 110(1)) for reliability and durability purposes. In some implementations, the entire data object can be reconstructed from the fragments as part of the rebuilding process.

Figure 2:
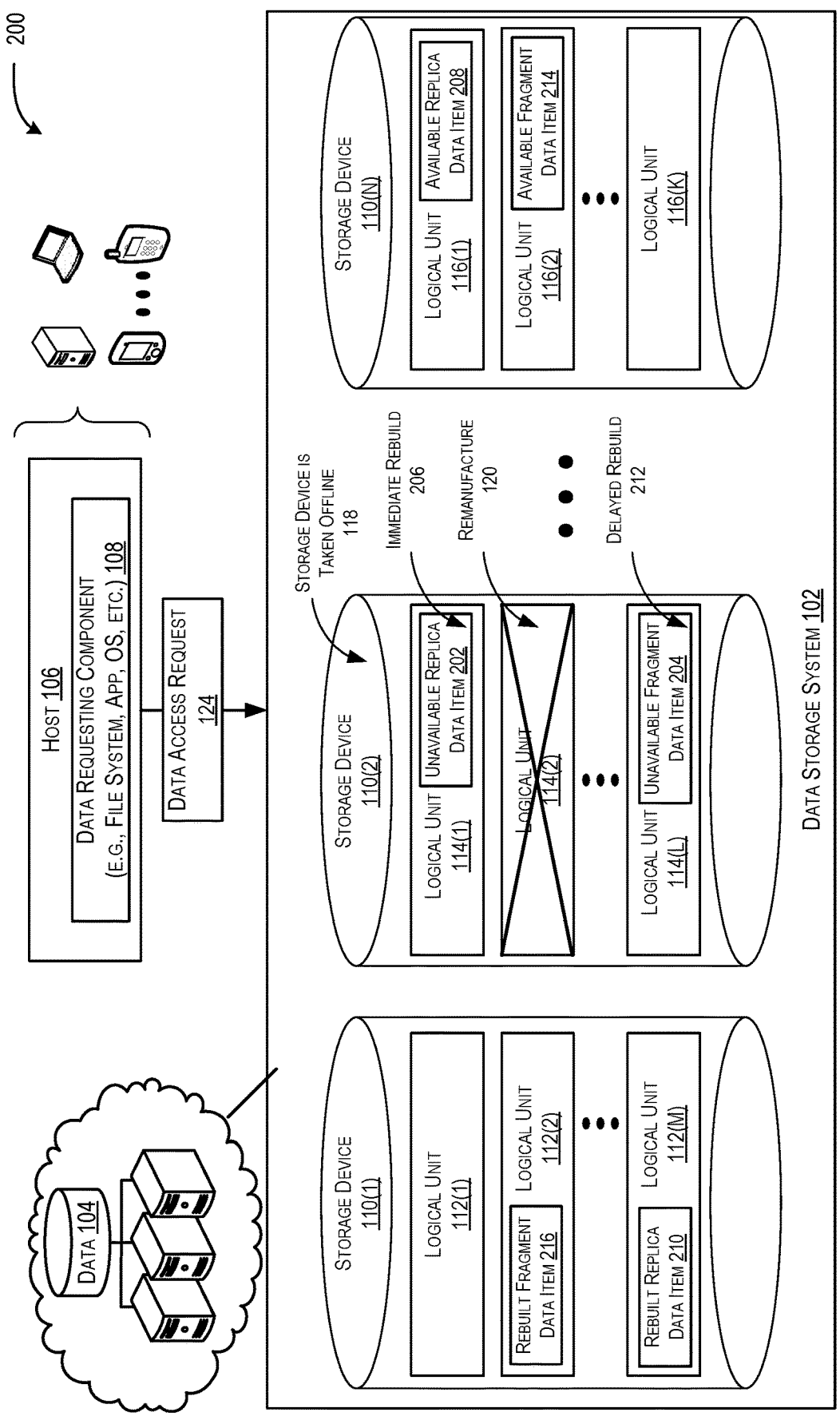
FIG. 2 is a diagram that illustrates another example environment in which the rebuilding of data items stored in uncompromised logical units of an offline storage device is implemented based on a type of reliability format in which the data items are stored.

FIG. 2 is a diagram that illustrates another example environment 200 in which the rebuilding of data items stored in uncompromised logical units of an offline storage device is implemented based on a type of reliability format in which the data items are stored. Similar to FIG. 1, in this example, storage device 110(2) is taken offline 118 in order to remanufacture 120 logical unit 114(2). However, FIG. 2 illustrates that the uncompromised logical units include data items stored in different reliability formats. That is, logical unit 114(1) stores a replica data item 202 that is unavailable due to the remanufacturing 120 of logical unit 114(2) and logical unit 114(L) stores a fragment data item 204 that is unavailable due to the remanufacturing 120 of logical unit 114(2).

In various embodiments, the data storage system 102 is configured to immediately rebuild the unavailable replica data item 202. That is, the immediate rebuilding of the unavailable replica data item 202 does not wait until a valid rebuilding reason is observed. In contrast, the data storage system 102 is configured to wait to rebuild the unavailable fragment data item 204 based on an observance of a valid reason (e.g., a data access request for the data item is received, the reliability and/or durability of an erasure coded data object associated with the data item is in jeopardy, etc.). The data storage system 102 is configured to handle the rebuilding of replica and fragment data items differently because replica data items are often associated with data objects that have been frequently accessed or that are expected to be frequently accessed (may be referred to herein as a "hot" data object). Meanwhile, fragment data items are often associated with data objects that are not being frequently accessed or that are not expected to be frequently accessed (may be referred to herein as a "cold" data object). Consequently, immediately rebuilding the replica data items stored in the logical units can provide higher performance and/or response for hot data objects. Moreover, with respect to resource consumption, it is cheaper to rebuild replica data items than it is to rebuild fragment data items.

As described above, given an erasure coded data object with six data fragments and three code fragments (e.g., a "6+3" erasure coded data object), the data storage system 102 can sustain up to three lost fragments and still restore individual fragments and/or reconstruct the original data object. However, to rebuild a lost fragment, the data storage system 102 has to read at least six fragments (e.g., six equations) which means the data storage system 102 has to read six times the original amount of data it is trying to rebuild. To further illustrate quantitatively, to rebuild a ten terabyte (TB) platter that completely stores fragment data items that are part of numerous "6+3" erasure coded data objects, the data storage system 102 would have to read sixty TB of data. In contrast, to rebuild a ten TB platter that completely stores replica data items associated with a number of entire data objects, the data storage system 102 would only have to read ten TB of data.

Accordingly, FIG. 2 illustrates that the unavailable replica data item 202 is immediately rebuilt 206 by accessing an available replica of the data item (e.g., available replica data item 208) from a different storage device (e.g., storage device 110(N)) that is online, creating an additional replica of the unavailable replica data item 202 based on the accessed replica of the data item, and storing the additional replica of the data item (e.g., the rebuilt replica data item 210) in yet another storage device (e.g., storage device 110(1)) for reliability and durability purposes.

FIG. 2 illustrates that the rebuilding of the unavailable fragment data item 204 is delayed 212 until a valid reason is observed. Upon the observance of a valid reason, the data storage system 102 rebuilds the unavailable fragment data item 204 by accessing a plurality of other available fragments of the associated erasure coded data object (e.g., available fragment data item 214) from other storage devices (e.g., storage device 110(N)) that are online, recovering the unavailable fragment data item 204 using the plurality of other available fragments, and storing the recovered fragment data item (e.g., the rebuilt fragment data item 216) in another storage device (e.g., storage device 110(1)) for reliability and durability purposes. In some implementations, the entire data object can be reconstructed from the fragments as part of the rebuilding process.

Figure 3:
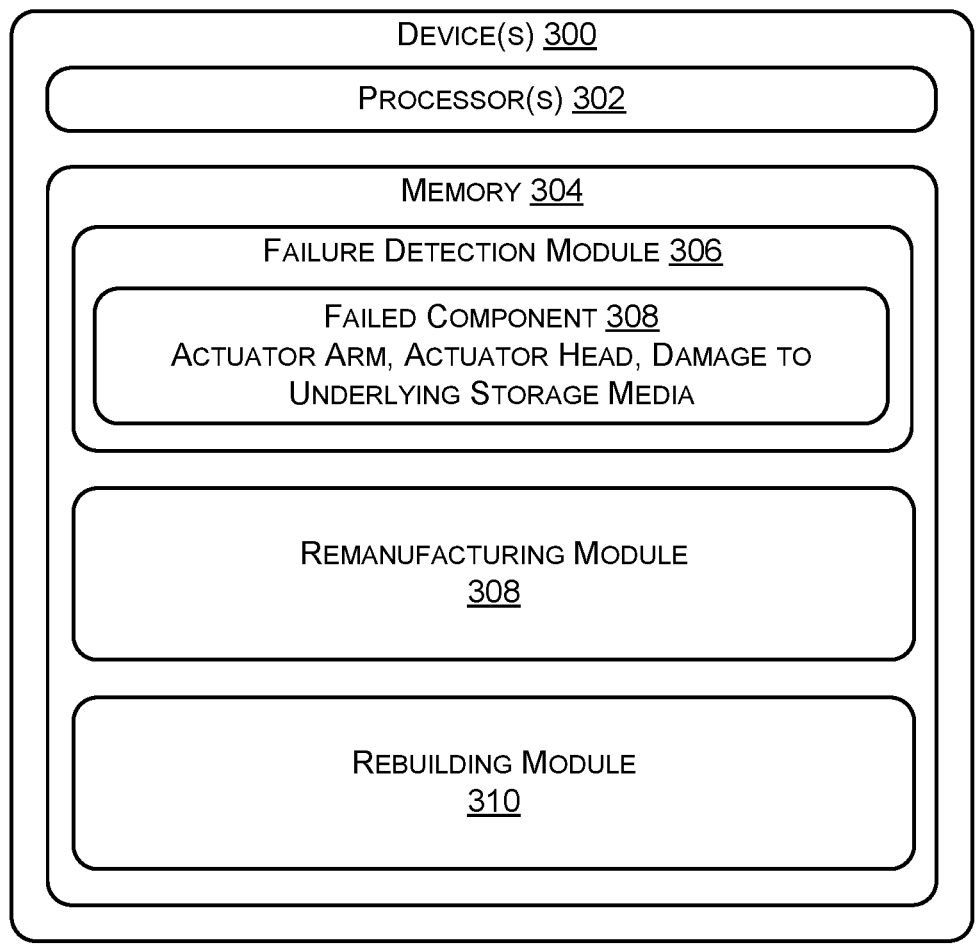
FIG. 3 illustrates example components of device(s) useable to monitor the status of storage devices and/or data items in a data storage system and rebuild data items based on the monitored status.

FIG. 3 illustrates example components of device(s) 300 (referred to herein as a device 300) useable to monitor the status of storage devices and/or data items in a data storage system and to rebuild data items based on the monitored status. The device 300 can be part of the data storage system 102 (e.g., a data center), and thus, the device 300 can be a server, a computer, or another device connected to the storage devices 110 and configured to manage the storage devices 110 and/or the storage of data 104. In some examples, the device 300 can comprise the host 106 or a storage device 110.

The device 300 can include one or more processor(s) 302 and memory 304. The processor(s) 302 can be a single processing unit or a number of units, each of which could include multiple different processing units. The processor(s) 302 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 302 can be configured to fetch and execute computer-readable instructions stored in the memory 304.

The memory 304 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 304 can include an operating system configured to manage hardware and services within and coupled to the device 300 for the benefit of other components and other devices. Moreover, the memory 304 can include a failure detection module 306 configured to detect when a component of a storage device (e.g., storage device 110(2)) in a data storage system fails. As described above, the failed component 308 can comprise an actuator arm, an actuator head, and/or damage to underlying storage media. Other failed components 308 of a storage device are also contemplated. The memory 304 can further include a remanufacturing module 310 and a rebuilding module 312. As used herein, the term "module" is intended to represent example divisions of executable instructions for purposes of discussion and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions. In various implementations, the modules described herein in association with device 300 can be executed across multiple devices that comprise the data storage system 102 and/or host(s) 106.

As described above, the failure detection module 306 is configured to detect when a component of a storage device (e.g., storage device 110(2)) in a data storage system 102 fails. Accordingly, the failure detection module 306 monitors the status and health of the storage devices 110 in the data storage system 102 to identify situations where a failed component 308 occurs. Based on the monitoring, the failure detection module 306 can identify a compromised logical unit on a storage device that is affected and/or impacted by the failed component 308. For example, the failure detection module 306 can deduce that at least some data on a compromised logical unit cannot be read, or that data cannot be written to the compromised logical unit. In various examples, the failure detection module 306 can manage the failed components and/or the uncompromised logical units and the data stored therein using assigned indexes and/or locations.

The remanufacturing module 310 is configured to manage the remanufacturing of the compromised logical unit (e.g., logical unit 114(2) on storage device 110(2)). For example, the remanufacturing module 310 can schedule the remanufacturing of the compromised logical unit which determines a time or time period in which a storage device is taken offline and/or will remain offline (e.g., disconnected from a network). Moreover, the remanufacturing module 310 performs the computer tasks associated with implementing the remanufacturing of the compromised logical unit.

When scheduling the remanufacturing, the remanufacturing module 310 considers storage and reliability policies. For instance, given a fragment data item of an erasure coded data object that is stored on the storage device to be taken offline, the remanufacturing module 310 will not take the storage device offline if a threshold number of other fragments of the erasure coded data object are already unavailable (e.g., other storage devices are already offline and unavailable). Or, given a replica data item that is stored on the storage device, the remanufacturing module 310 will not take the storage device offline if a threshold number of other replicas of the same data object are already unavailable (e.g., other storage devices are already offline and unavailable).

The rebuilding module 312 is configured to monitor for occurrences of reasons to rebuild data items and/or to rebuild the data items. As described above, in some embodiments, the rebuilding module 312 is configured to monitor for and wait for valid reasons to rebuild any data item stored in uncompromised logical units of a storage device that is offline. A valid reason comprises reception of a data access request for a data item. Another valid reason comprises a determination that the reliability of a corresponding data object is in jeopardy. In additional embodiments, the rebuilding module 312 is configured to immediately rebuild replica data items stored in uncompromised logical units of a storage device that is offline or scheduled to be taken offline and to monitor for and wait for valid reasons to rebuild fragment data items stored in the uncompromised logical units. The rebuilding of a data item stored in an uncompromised logical unit occurs concurrently with the remanufacturing of the compromised logical unit and before the storage device is brought back online.

Figure 4:
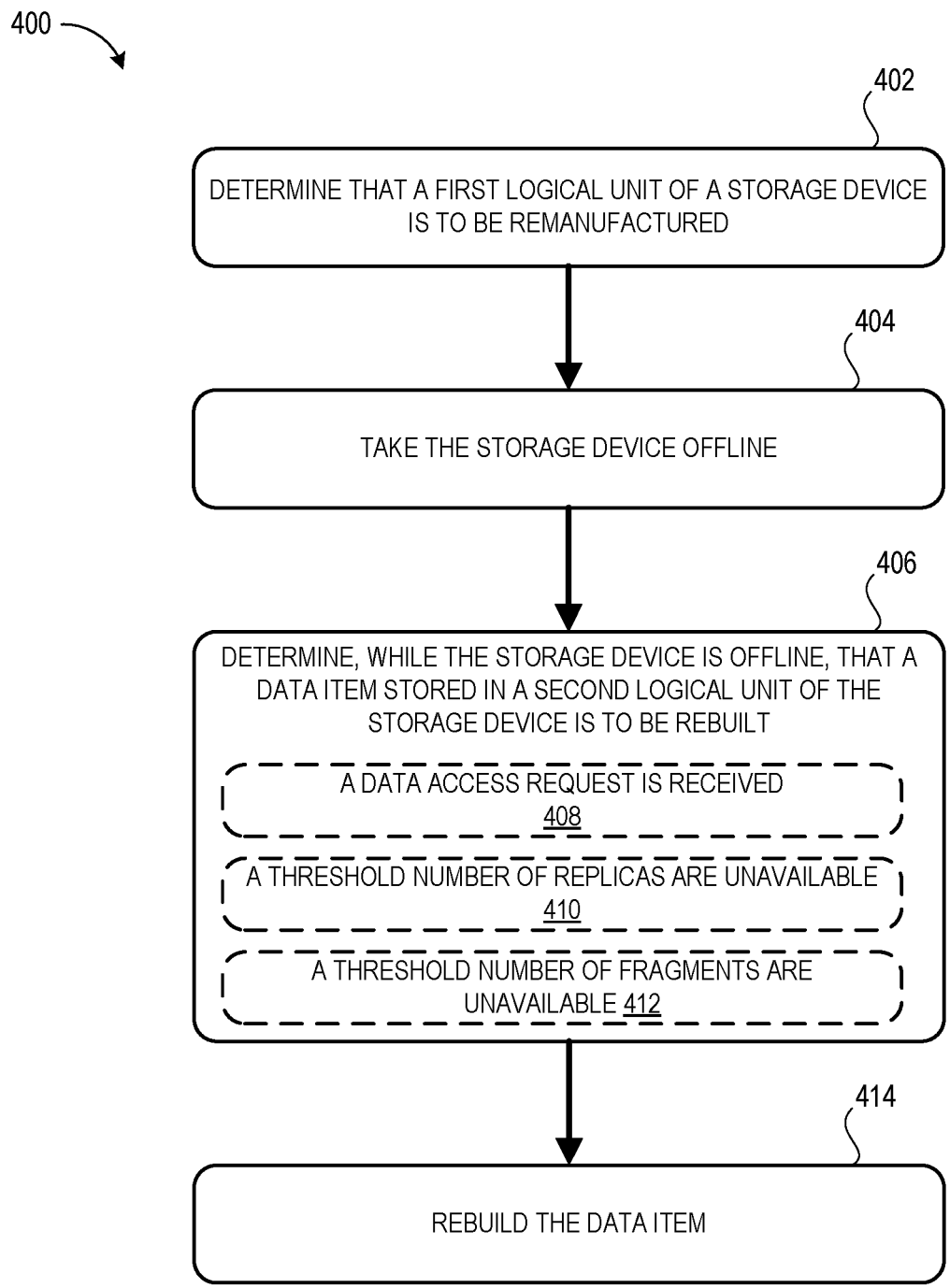
FIG. 4 illustrates an example process that monitors for and determines a valid reason to rebuild a data item stored on an uncompromised logical unit of a storage device that has been taken offline to remanufacture a compromised logical unit.
Figure 5:
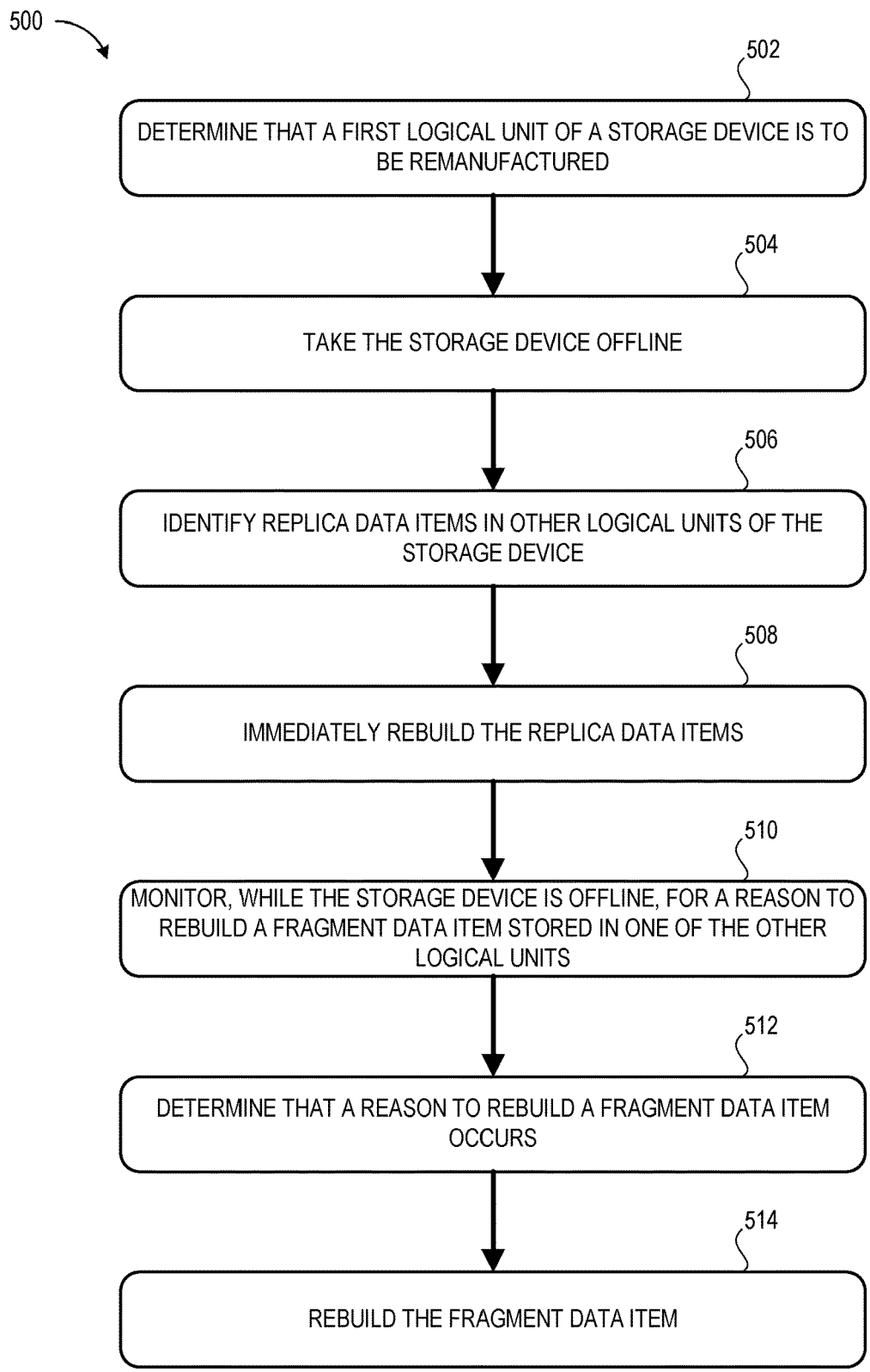
FIG. 5 illustrates an example process that rebuilds data items differently based on a type of reliability format in which the data items are stored.

FIGS. 4 and 5 individually illustrate an example process for employing the techniques described herein. The example processes can be performed in the environments 100 and/or 200 of FIG. 1 and/or FIG. 2. Moreover, the example processes can be implemented by the device(s) 300 illustrated in FIG. 3. However, the processes can be performed in other environments and by other devices as well. The example processes are illustrated as logical flow graphs, each operation of which may represent a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 4 illustrates an example process 400 that monitors for and determines a valid reason to rebuild a data item stored on an uncompromised logical unit of a storage device that has been taken offline to remanufacture a compromised logical unit.

At operation 402, it is determined that a first logical unit of a storage device that contains multiple independent logical units is to be remanufactured. For example, the first logical unit may comprise underlying storage media (e.g., one or more platter surfaces) that is accessible via a failed component (e.g., an actuator head, an actuator arm, etc.).

At operation 404, the storage device is taken offline so that the remanufacturing of the first logical unit can be implemented. As described above, a module of a data storage system can schedule when the storage device is to be taken offline in order to have the first logical unit remanufactured.

At operation 406, it is determined, while the storage device is offline, that a data item stored in a second logical unit of the storage device is to be rebuilt. As previously described, this determination can be made based on an observance of a valid reason. In one example, a valid reason includes the reception of a data access request 408 for the data item (e.g., a host 106 can request to access the data item). In another example, a valid reason includes a determination that a threshold number of replicas of a data object are unavailable 410 (e.g., two of three replicas of a data object are simultaneously unavailable). In another example, a valid reason includes a determination that a threshold number of fragments of an erasure coded data object are unavailable 412 (e.g., two fragments of the erasure coded data object are simultaneously unavailable, and the erasure coded data object can only tolerate up to three unavailable fragments).

At operation 414, the data item is rebuilt. Examples of rebuilding the data item are provided above with respect to FIGS. 1 and 2.

FIG. 5 illustrates an example process 500 that rebuilds data items differently based on a type of reliability format in which the data items are stored.

At operation 502, it is determined that a first logical unit of a storage device that contains multiple independent logical units is to be remanufactured.

At operation 504, the storage device is taken offline so that the remanufacturing of the first logical unit can be implemented.

At operation 506, the replica data items stored on logical units other than the first logical unit that is subject to be remanufactured are identified. For example, location and index metadata maintained within the data storage system can be used to identify the replica data items.

At operation 508, the replica data items are immediately rebuilt. The immediate rebuilding of a replica data item does not wait until a valid rebuilding reason is observed.

At operation 510, the data storage system monitors, while the storage device is offline, for a reason to rebuild a fragment data item stored in one of the other logical units.

At operation 512, it is determined that a reason to rebuild the fragment data item occurs.

At operation 514, the fragment data item is rebuilt.

The data storage system 102 may be configured to immediately rebuild replica data items stored on uncompromised logical units because the corresponding data object is, or qualifies, as a data object that has been frequently accessed or that is expected to be frequently accessed. Accordingly, a storage policy configures such data objects to be stored as replica data items. In contrast, fragment data items are typically associated with data objects that are not being frequently accessed or that are not expected to be frequently accessed. Consequently, immediately rebuilding the replica data items stored in the logical units can provide higher performance metrics and/or response times for hot data objects. Furthermore, another reason to immediately rebuild replica the data items stored on uncompromised logical units is because, from a resource consumption perspective, it is cheaper to rebuild replica data items compared to rebuilding fragment data items. Stated alternatively, the amount of resources used to rebuild a replica data item is much less than that used to rebuild a fragment data item.

Figure 6:
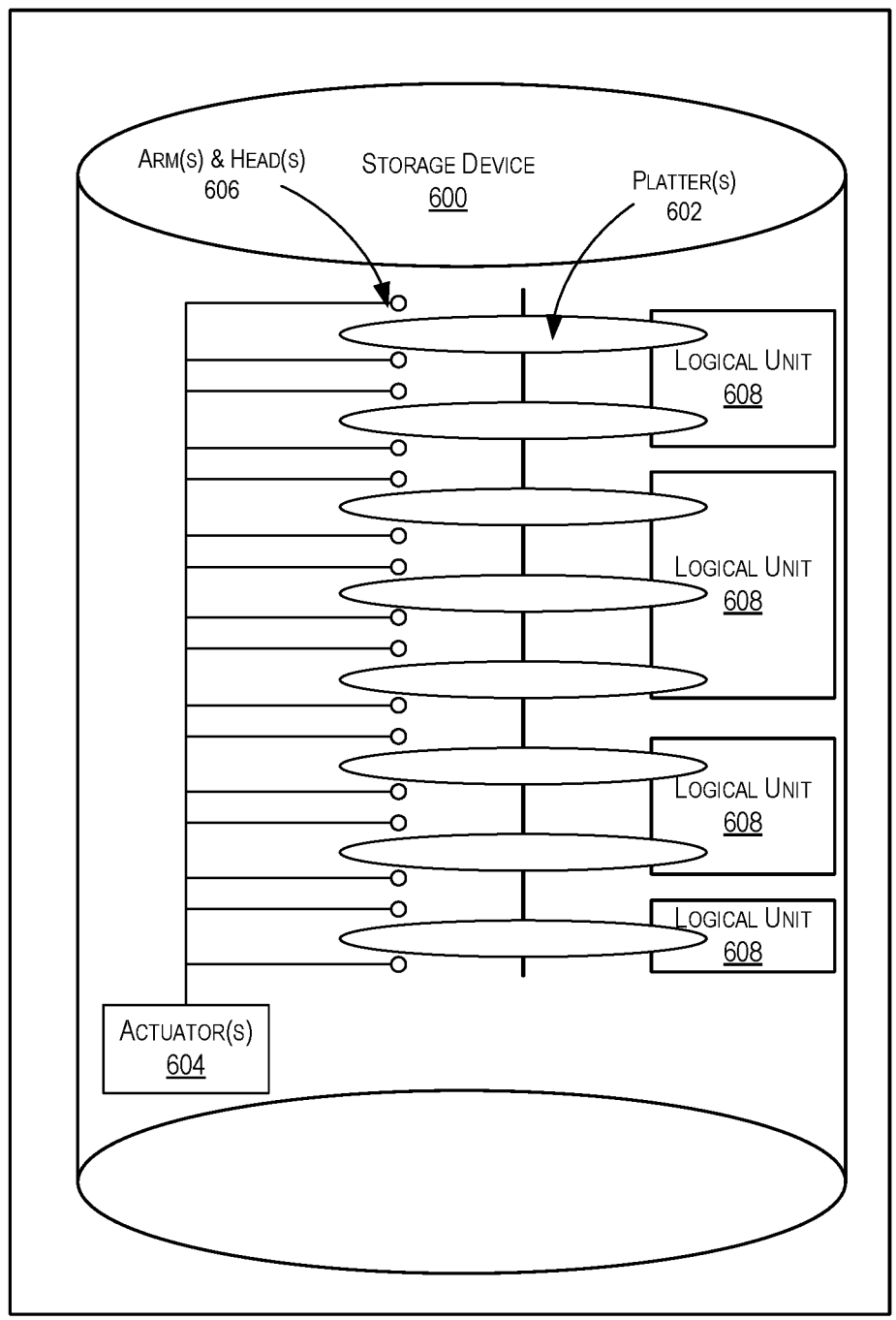
FIG. 6 illustrates an example storage device (e.g., a hard-disk drive (HDD)) with multiple platters on a spindle, and multiple logical units where each logical comprises at least one platter surface.

FIG. 6 illustrates an example storage device 600. In this example, the storage device comprises a hard-disk drive (HDD) with multiple platters 602 on a spindle. FIG. 6 illustrates eight platters 602. Moreover, FIG. 6 illustrates actuator(s) 604 with multiple arms and multiple heads 606 (e.g., sixteen arms and heads), a head for each surface (e.g., side) of a platter 602. The storage device 600 further illustrates logical units 610, where each logical unit 610 operates independently over a subset of the total number of surfaces in the storage device 600. A HDD likely contains between two and eight logical units. When the storage device 600 experiences a head failure, the surface associated with the head failure also fails. Consequently, a logical unit to which the failed surface belongs needs to be remanufactured.

Figure 7:
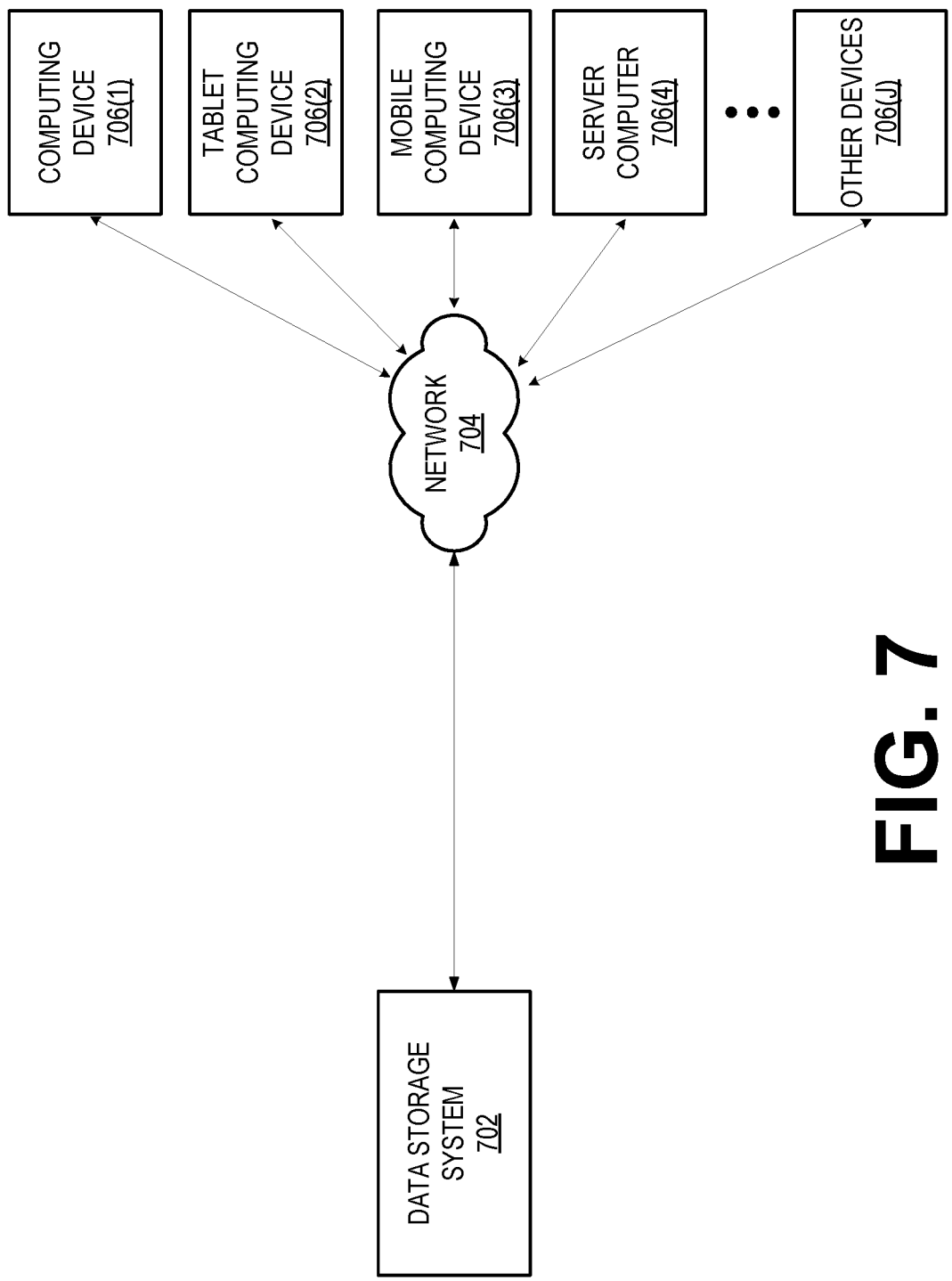
FIG. 7 illustrates an example computing environment capable of executing the techniques and processes described herein.

FIG. 7 illustrates an example computing environment capable of executing the techniques and processes described above with respect to FIGS. 1-6. In various examples, the computing environment comprises a data storage system 702 (e.g., data storage system 102). In various examples, the data storage system 702 operates on, in communication with, or as part of a network 704.

The network 704 can be or can include various access networks. For example, one or more client devices 706(1) through 706(J) can communicate with the data storage system 702 via the network 704 and/or other connections. The data storage system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the data storage system 702 can be provided by one or more servers and/or storage devices that are executing as part of, or in communication with, the network 704. A server can host various services, virtual machines, portals, and/or other resources. For example, a server can host or provide access to one or more portals, Web sites, and/or other information.

The data storage system 702 can communicate over the network 704 via network interfaces. The network interfaces can include various types of network hardware and software for supporting communications between two or more devices.

The disclosure presented herein may be considered in view of the following example clauses.

Example Clause A, a system comprising: one or more processors; and computer-readable media storing instructions that, when executed by the one or more processors, cause the system to: determine that a first logical unit of a storage device is to be remanufactured, wherein the first logical unit is one of multiple independent logical units on the storage device; take the storage device offline to initiate remanufacturing of the first logical unit; determine, while the storage device is offline, that a data access request for a data item stored in a second logical unit is received, the second logical unit being different than the first logical unit; and rebuild the data item stored in the second logical unit based at least in part on the determining that the data access request for the data item stored in the second logical unit is received.

Example Clause B, the system of Example Clause A, wherein a logical unit comprises a uniquely addressable portion of the storage device.

Example Clause C, the system of Example Clause A or Example Clause B, wherein the storage device comprises a first storage device and the rebuilding the data item stored in the second logical unit comprises: accessing a replica of the data item via a second storage device; creating an additional replica of the data item based on the accessed replica of the data item; and storing the additional replica of the data item on a third storage device.

Example Clause D, the system of Example Clause A or Example Clause B, wherein: the storage device comprises a first storage device; the data item comprises a fragment of an erasure coded data object; and the rebuilding the data item comprises: accessing a plurality of other fragments of the erasure coded data object from a group of other storage devices; and recovering the data item using the plurality of other fragments; and storing the recovered data item in a second storage device.

Example Clause E, the system of any one of Example Clauses A through D, wherein the rebuilding of the data item stored in the second logical unit occurs concurrently with the remanufacturing of the first logical unit and before the storage device is brought back online.

Example Clause F, the system of any one of Example Clauses A through E, wherein: the storage device comprises a hard disk drive with multiple platters, each of the multiple platters comprising two surfaces where each surface is serviced by an actuator head; the first logical unit comprises a surface that is associated with a failed actuator head, the failed actuator head causing the remanufacturing of the first logical unit; and the second logical unit comprises one or more surfaces that are respectively associated with a working actuator head.

While Example Clauses A through F are described above with respect to a system, it is understood in the context of this disclosure that the subject matter of Example Clauses A through F can additionally or alternatively be implemented as a method or via computer readable storage media.

Example Clause G, a method comprising: determining that a first logical unit of a storage device is to be remanufactured, wherein the first logical unit is one of multiple independent logical units on the storage device; taking the storage device offline to initiate remanufacturing of the first logical unit; determining, while the storage device is offline, that a data item stored in a second logical unit of the multiple independent logical units is to be rebuilt, the second logical unit being different than the first logical unit; and rebuild the data item stored in the second logical unit based at least in part on the determining that the data item stored in the second logical unit is received is to be rebuilt.

Example Clause H, the method of Example Clause G, wherein the data item is a fragment of an erasure coded data object and the determining that the data item is to be rebuilt is based at least in part observing that a threshold number of fragments of the erasure coded data object are unavailable.

Example Clause I, the method of Example Clause H, wherein the threshold number of fragments is one less than a number of unavailable fragments the erasure coded data object is configured to tolerate.

Example Clause J, the method of Example Clause G, wherein the data item is a replica of a data object and the determining that the data item is to be rebuilt is based at least in part observing that a threshold number of replicas of the data object are unavailable.

Example Clause K, the method of Example Clause J, wherein the threshold number of replicas is one less than a total number of replicas of the data object stored in data storage system.

Example Clause L, the method of any one of Example Clauses G, J, or K, wherein the storage device comprises a first storage device and the rebuilding the data item stored in the second logical unit comprises: accessing a replica of the data item via a second storage device; creating an additional replica of the data item based on the accessed replica of the data item; and storing the additional replica of the data item on a third storage device.

Example Clause M, the method of any one of Example Clauses G, H, or I, wherein: the storage device comprises a first storage device; the data item comprises a fragment of an erasure coded data object; and the rebuilding the data item comprises: accessing a plurality of other fragments of the erasure coded data object from a group of other storage devices; and recovering the data item using the plurality of other fragments; and storing the recovered data item in a second storage device.

Example Clause N, the method of any one of Example Clauses G through M, wherein the rebuilding of the data item stored in the second logical unit occurs concurrently with the remanufacturing of the first logical unit and before the storage device is brought back online.

While Example Clauses G through N are described above with respect to a method, it is understood in the context of this disclosure that the subject matter of Example Clauses G through N can additionally or alternatively be implemented by a system or via computer readable storage media.

Example Clause O, a system comprising: one or more processors; and computer-readable media storing instructions that, when executed by the one or more processors, cause the system to: determine that a first logical unit of a storage device is to be remanufactured, wherein the first logical unit is one of multiple independent logical units on the storage device; take the storage device offline to initiate remanufacturing of the first logical unit; identify replica data items in other logical units of the multiple independent logical units; rebuild the replica data items in the other logical units; determine, while the storage device is offline, that a fragment data item stored in one of the other logical units is to be rebuilt, the fragment data item being part of an erasure coded data object; and rebuild the fragment data item stored in the one of the other logical units.

Example Clause P, the system of Example Clause O, wherein the determining that the fragment data item is to be rebuilt is based at least in part on observing that a threshold number of fragments of the erasure coded data object are unavailable.

Example Clause Q, the system of Example Clause P, wherein the threshold number of fragments is one less than a number of unavailable fragments the erasure coded data object is configured to tolerate.

Example Clause R, the system of Example Clause O, wherein the determining that the fragment data item is to be rebuilt is based at least in part on determining that a data access request for the erasure coded data object has been received.

Example Clause S, the system of any of Example Clauses O through R, wherein the rebuilding of the fragment data item stored in the one of the other logical unit occurs concurrently with the remanufacturing of the first logical unit and before the storage device is brought back online.

Example Clause T, the system of any of Example Clauses O through S, wherein the rebuilding the fragment data item comprises: accessing a plurality of other fragments of the erasure coded data object from a group of other storage devices; and recovering the fragment data item using the plurality of other fragments; and storing the recovered data item in a second storage device.

While Example Clauses O through T are described above with respect to a system, it is understood in the context of this disclosure that the subject matter of Example Clauses O through T can additionally or alternatively be implemented as a method or via computer readable storage media.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   determining that a first logical unit of a storage device is to be remanufactured, wherein the first logical unit is one of multiple independent logical units on the storage device;
   taking the storage device offline to initiate remanufacturing of the first logical unit;
   determining, while the storage device is offline, that a data item stored in a second logical unit of the multiple independent logical units is to be rebuilt, the second logical unit being different than the first logical unit, wherein:
     the data item is a fragment of an erasure coded data object;
     the determining that the data item stored in the second logical unit is to be rebuilt is based at least in part on observing that a threshold number of fragments of the erasure coded data object are unavailable; and
     the threshold number of fragments is one less than a number of unavailable fragments the erasure coded data object is configured to tolerate; and
   rebuilding the data item stored in the second logical unit based at least in part on the determining that the data item stored in the second logical unit is to be rebuilt.

2. The method of claim 1, wherein:
   the storage device comprises a first storage device; and
   the rebuilding the data item comprises:
     accessing a plurality of other fragments of the erasure coded data object from a group of other storage devices; and
     recovering the data item using the plurality of other fragments; and
     storing the recovered data item in a second storage device.

3. The method of claim 1, wherein the rebuilding of the data item stored in the second logical unit occurs concurrently with the remanufacturing of the first logical unit and before the storage device is brought back online.

4. A system comprising:
   one or more processors; and
   computer-readable media storing instructions that, when executed by the one or more processors, cause the system to:
     determine that a first logical unit of a storage device is to be remanufactured, wherein the first logical unit is one of multiple independent logical units on the storage device;

take the storage device offline to initiate remanufacturing of the first logical unit;

identify replica data items in other logical units of the multiple independent logical units;

based on the identification, begin rebuilding the identified replica data items in the other logical units, without waiting for a data access request for a corresponding replica data item to first be received;

determine, while the storage device is offline, that a fragment data item stored in one of the other logical units is to be rebuilt, the fragment data item being part of an erasure coded data object; and based on the determination that the fragment data item is to be rebuilt, rebuild the fragment data item stored in the one of the other logical units.

5. The system of claim 4, wherein the determining that the fragment data item is to be rebuilt is based at least in part on observing that a threshold number of fragments of the erasure coded data object are unavailable.

6. The system of claim 5, wherein the threshold number of fragments is one less than a number of unavailable fragments the erasure coded data object is configured to tolerate.

7. The system of claim 4, wherein the determining that the fragment data item is to be rebuilt is based at least in part on determining that a data access request for the erasure coded data object has been received.

8. The system of claim 4, wherein the rebuilding of the fragment data item stored in the one of the other logical units occurs concurrently with the remanufacturing of the first logical unit and before the storage device is brought back online.

9. The system of claim 4, wherein the rebuilding the fragment data item comprises:

accessing a plurality of other fragments of the erasure coded data object from a group of other storage devices; and recovering the fragment data item using the plurality of other fragments; and storing the recovered data item in a second storage device.

* * * * *